US008624181B1

(12) United States Patent
Newton

(10) Patent No.: US 8,624,181 B1
(45) Date of Patent: Jan. 7, 2014

(54) CONTROLLING ION FLUX INTO TIME-OF-FLIGHT MASS SPECTROMETERS

(71) Applicant: Agilent Technologies, Inc., Loveland, CO (US)

(72) Inventor: Kenneth Newton, Loveland, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

(21) Appl. No.: 13/840,898

(22) Filed: Mar. 15, 2013

(51) Int. Cl.
*H01J 49/40* (2006.01)
*H01J 49/26* (2006.01)
*B01D 59/44* (2006.01)

(52) U.S. Cl.
USPC ........... 250/287; 250/288; 250/281; 250/282; 250/423 R; 250/424

(58) Field of Classification Search
USPC .............. 250/287, 288, 281, 282, 423 R, 424
See application file for complete search history.

(56) References Cited

U.S. PATENT DOCUMENTS

| | | | | |
|---|---|---|---|---|
| 6,930,305 | B2 * | 8/2005 | Covey et al. | 250/288 |
| 7,323,682 | B2 | 1/2008 | McCauley et al. | |
| 7,405,397 | B2 * | 7/2008 | Covey et al. | 250/288 |
| 8,129,675 | B2 | 3/2012 | Schultz et al. | |
| 8,183,524 | B2 * | 5/2012 | Kenny et al. | 250/287 |
| 8,283,626 | B2 | 10/2012 | Brown et al. | |
| 2009/0230301 | A1 | 9/2009 | Furuhashi et al. | |
| 2012/0119078 | A1 | 5/2012 | Green et al. | |

* cited by examiner

*Primary Examiner* — Nikita Wells

(57) ABSTRACT

A time-of-flight mass spectrometer (TOF MS) includes an ion gate, an ion guide downstream of the ion gate, and a TOF analyzer downstream of the ion guide. The TOF MS is operated with an adjustable duty cycle to limit the amount of ions entering a TOF analyzer and avoid saturating a detector system of the TOF MS. The duty cycle is adjusted by controlling the ion gate. The ion guide emits ions as a continuous beam, without trapping the ions. The ion guide may be operated as a collision cell. The TOF MS may also include a mass filter upstream of the ion guide.

20 Claims, 2 Drawing Sheets

CONTROLLING ION FLUX INTO TIME-OF-FLIGHT MASS SPECTROMETERS

TECHNICAL FIELD

The present invention relates to acquisition of spectrometric data by time-of-flight mass spectrometry (TOF MS), and more particularly to controlling the number of ions entering the TOF analyzer of an MS system.

BACKGROUND

A mass spectrometry (MS) system in general includes an ion source for ionizing components of a sample of interest, a mass analyzer for separating the ions based on their differing mass-to-charge ratios (or m/z ratios, or more simply "masses"), an ion detector for counting the separated ions, and electronics for processing output signals from the ion detector as needed to produce a user-interpretable mass spectrum. Typically, the mass spectrum is a series of peaks indicative of the relative abundances of detected ions as a function of their m/z ratios. The mass spectrum may be utilized to determine the molecular structures of components of the sample, thereby enabling the sample to be qualitatively and quantitatively characterized.

A time-of-flight mass spectrometer (TOF MS) utilizes a high-resolution mass analyzer (TOF analyzer). Ions are transported from the ion source into the TOF entrance region through a series of ion guides and ion lenses. The TOF analyzer extracts ions in pulses (or packets) into an electric field-free drift tube. In the drift tube, ions of differing masses travel at different velocities and thus separate (spread out) according to their differing masses, enabling mass resolution based on time-of-flight.

To elucidate additional information regarding a sample, an MS system may be configured for carrying out tandem MS, or MS-MS, experiments. MS-MS may be implemented in a TOF-based system, an example of which is the qTOF system. The qTOF system utilizes, in series, a first quadrupole device, a second quadrupole device, and a TOF analyzer. The first quadrupole device is operated as a mass filter to select a single ion mass or mass range from the larger range of ions provided by the ion source. The second quadrupole device is typically an RF-only device enclosed in a gas chamber and utilized as a collision cell to dissociate the selected ions, or "parent" ions, into fragment ions (or "daughter" ions) by collision induced dissociation (CID). Parent ions and/or fragment ions may be analyzed by the TOF analyzer. If parent ion spectra are desired at the high resolution obtained in the TOF section, the gas in the collision cell is often left at its normal pressure but the ions entering the collision cell are reduced to a low enough energy to avoid fragmentation. In all these arrangements, typically there is no means available for limiting the ion signal in cases where the detector system, e.g. the electronics employed in collecting/accumulating and processing ion signals, is saturated or overloaded.

Therefore, there is a need for TOF MS systems and methods that provide a way to limit the number of ions entering the TOF analyzer to avoid detector system saturation.

SUMMARY

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to one embodiment, a method for controlling ion transfer into a time-of-flight (TOF) analyzer includes: transmitting ions through an ion gate and into an ion guide while operating the ion gate at a first duty cycle; transmitting the ions through the ion guide without trapping the ions; transmitting the ions into the TOF analyzer and measuring one or more ion signals corresponding to one or more mass peaks; comparing an intensity of the largest ion signal measured to a target value; and if the intensity of the largest ion signal is different from the target value, adjusting the duty cycle to a second duty cycle different from the first duty cycle.

According to another embodiment, a TOF mass spectrometry (TOF MS) system is configured for performing one or more steps of any of the methods disclosed herein.

According to another embodiment, a computer-readable storage medium includes instructions for performing one or more steps of any of the methods disclosed herein.

According to another embodiment, a time-of-flight mass spectrometry (TOF MS) system includes the computer-readable storage medium.

According to another embodiment, a TOF MS system includes: an ion gate; an ion guide downstream of the ion gate; a time-of-flight (TOF) analyzer downstream of the ion guide; and a controller communicating with the ion gate, the ion guide and the TOF analyzer. In some embodiments, the controller may be configured for controlling the following steps: transmitting ions through an ion gate and into an ion guide while operating the ion gate at a first duty cycle; transmitting the ions through the ion guide without trapping the ions; transmitting the ions into the TOF analyzer and measuring one or more ion signals corresponding to one or more mass peaks; comparing an intensity of the largest ion signal measured to a target value; and if the intensity of the largest ion signal is different from the target value, adjusting the duty cycle to a second duty cycle different from the first duty cycle.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

The present disclosure describes time-of-flight mass spectrometry (TOF MS) systems and methods for controlling the transfer of ions into the TOF analyzer of such systems, thereby avoiding detector system saturation. Ion transfer may be controlled in a way that retains the quantitative nature of the analysis. All ions may be transferred into the TOF analyzer during times when the detector system is not saturated. If the detector system is saturated or approaching saturation, the number of ions transferred into the TOF analyzer may be limited by way of a gating process described below. By avoiding saturation of the detector system, the dynamic range of the TOF MS system may be extended beyond the range currently possible. Moreover, as new techniques that improve ion transport efficiency into the TOF analyzer become available, embodiments disclosed herein may allow for increased sensitivity and lower detection limits without further limiting the high end of the dynamic range.

Figure 1:
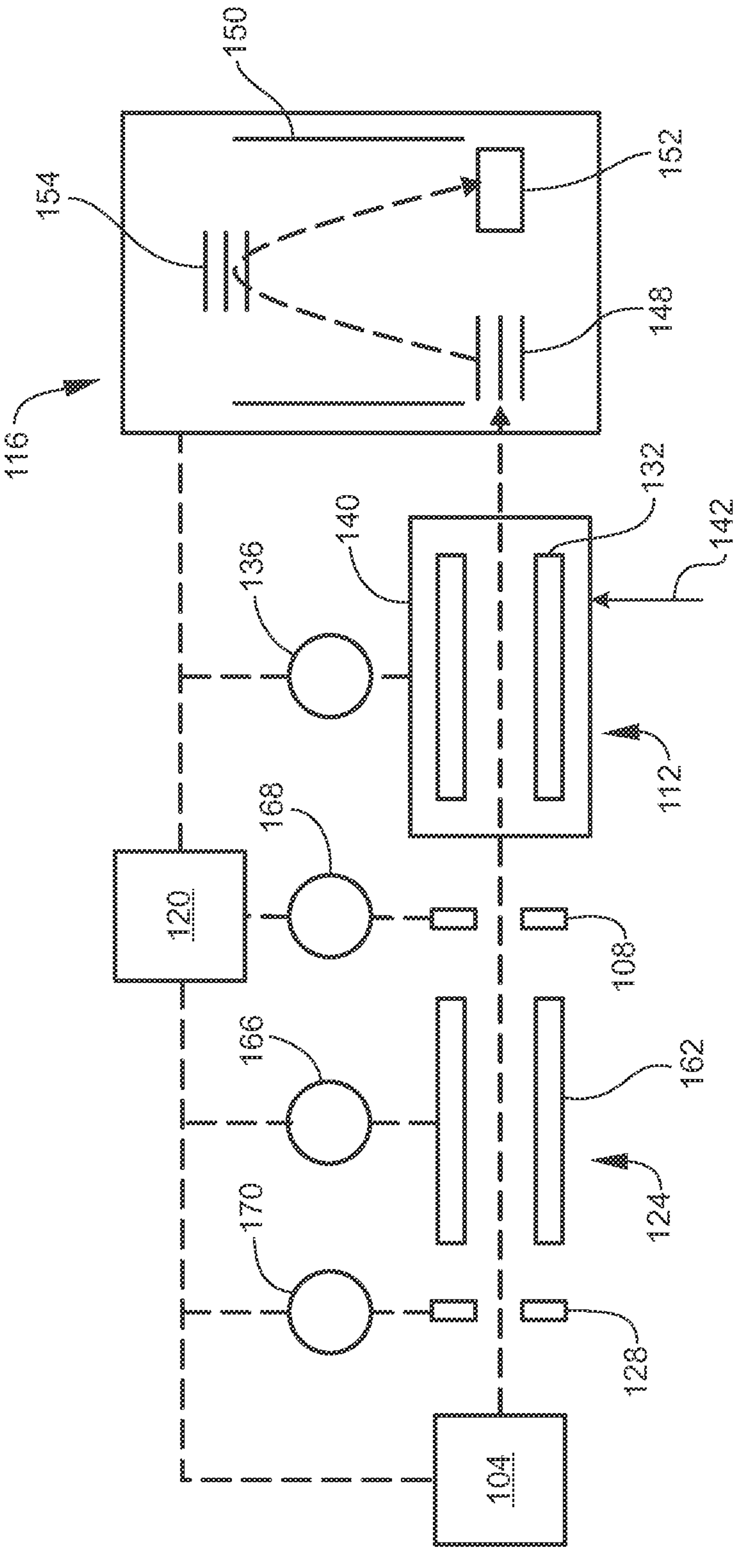
FIG. 1 is a schematic view of an example of a time-of-flight mass spectrometry (TOF MS) system according to some embodiments.

FIG. 1 is a schematic view of an example of a time-of-flight mass spectrometry (TOF MS) system 100 according to one embodiment. The TOF MS system 100 generally includes, in series, an ion source 104, an ion gate 108, an ion guide 112, a TOF analyzer 116, and a system controller (or controller) 120. As described below, the ion gate 108 is utilized to control a duty cycle according which ions are transmitted into the TOF analyzer 116. In some embodiments, the ion guide 112 may be operated as a collision cell. In some embodiments, the TOF MS system 100 may further include a mass filter 124 between the ion source 104 and the ion guide 112. Ion optics 128 may be present between the ion source 104 and the mass filter 124. In some embodiments, the ion optics 128 may be configured and operated as an ion gate for controlling the duty cycle instead of the ion gate 108.

The ion source 104 may be any type of continuous-beam or pulsed ion source suitable for TOF MS. Examples of ion sources 104 include, but are not limited to, electrospray ionization (ESI) sources, other atmospheric pressure ionization (API) sources, photo-ionization (PI) sources, electron ionization (EI) sources, chemical ionization (CI) sources, laser desorption ionization (LDI) sources, and matrix-assisted laser desorption ionization (MALDI) sources. Depending on the type of ionization implemented, the ion source 104 may reside in a vacuum chamber or may operate at or near atmospheric pressure. Sample material to be analyzed may be introduced to the ion source 104 by any suitable means, including hyphenated techniques in which the sample material is the output of an analytical separation instrument such as, for example, a gas chromatography (GC) or liquid chromatography (LC) instrument (not shown).

The ion guide 112 generally operates to focus and transmit ions. For this purpose, the ion guide 112 may include a linear multipole electrode configuration (e.g., quadrupole, hexapole, octopole, etc.). In the illustrated embodiment, the ion guide 112 includes a plurality of guide electrodes 132 (only two of which are shown) arranged about a guide axis such that they are circumferentially spaced from each other about the guide axis. The guide electrodes 132 are positioned at radial distances from the guide axis, thereby surrounding an interior region of the ion guide 112 that is elongated along the guide axis. The ion guide 112 further includes a guide entrance (or ion entrance) into the interior region, and a guide exit (or ion exit) out from the interior region. A voltage source 136, controlled by the controller 120, applies an RF voltage or composite RF/DC voltage to the guide electrodes 132 to confine ions along the guide axis. DC voltages, controlled by the controller 120, may also be utilized to accelerate the ions from the guide entrance to the guide exit. The ion guide 112 also functions as an ion cooler for thermalizing or damping the ions. In some embodiments, the ion guide 112 also functions as a collision cell to fragment ions. For such purposes, the guide electrodes 132 may be enclosed in a gas chamber 140. A gas inlet 142 admits a neutral damping or collision gas (e.g., helium, nitrogen, argon, etc.) into the gas chamber 140 to enable thermalization, and in some embodiments the gas pressure may be increased to a level enabling ion fragmentation by collision-induced dissociation (CID). The ion guide 112 may thus be configured to output parent ions, fragment ions, or a mixture of fragment ions and non-fragmented parent ions.

In other embodiments, the illustrated ion guide 112 may schematically represent two separate ion guides, one configured or operated as a collision cell and the other configured or operated to cool the ions without causing fragmentation. The collision cell may be either upstream or downstream of the ion cooler.

The TOF analyzer 116 generally includes an ion pulser (or extractor) 148, an electric field-free drift tube 150, and an ion detector 152 enclosed in a vacuum chamber. The ion pulser 148 accelerates packets of ions received from the ion guide 112 into the drift tube 150. The voltage applied to the ion pulser 148 and the pulse rate (extraction rate) are controlled by the controller 120. The ions extracted by the ion pulser 148 travel along a flight path in the drift tube 150 at mass-dependent velocities and arrive at the detector 152, which produces ion detection signals from which a mass spectrum of the detected ions may be generated, as appreciated by persons skilled in the art. In some embodiments, the TOF analyzer 116 has an orthogonal configuration, by which ions are accelerated in a direction orthogonal to the direction in which they entered the TOF analyzer 116, are reflected by a reflectron (ion mirror) 154, and then travel back through the drift tube 150 to the detector 152. Orthogonal TOF designs offer advantages known to persons skilled in the art.

The detector 152 may be part of a detector system that includes electronics configured for collecting, summing and otherwise processing the detected signals as needed for producing spectral information. One or more components of the detector system may be prone to saturation or overloading, one non-limiting example being one or more analog-to-digital converters (ADCs) commonly used in conjunction with the data recorder that records multiple ions per transient. Saturation of the detector system (i.e., one or more components of the detector system) is addressed by embodiments described herein.

The mass filter 124, when provided, operates to receive ions having a range of masses (m/z ratios) from the ion source 104 and, by imposing stability conditions on ion trajectories, allows only ions of a selected mass, or (typically narrow) range of masses, to pass through to the ion guide 112. For this purpose, the mass filter 124 may include a linear multipole electrode configuration similar to that of the ion guide 112. Thus, the mass filter 124 may include a plurality of filter electrodes 162 (only two of which are shown) circumferentially arranged about a filter axis and surrounding an elongated interior region of the mass filter 124. The mass filter 124 further includes a filter entrance (or ion entrance) into the interior region, and a filter exit (or ion exit) out from the interior region. A voltage source 166 applies a composite RF/DC voltage to the filter electrodes 162 to establish conditions that allow only ions of a selected mass or mass range to successfully traverse the axial length of the mass filter 124 and exit from the filter exit. The mass filter 124 may operate as a continuous beam device that does not store or trap ions.

The ion gate 108 (or 128) may be cycled between an open state and a closed state. The cycling parameters (voltage magnitude, pulse rate) may be controlled by a voltage source 168 (or 170) and the controller 120. The ion gate 108 may have any structure suitable for gating or deflecting ions in response to a control signal, such as various types of ion optics devices appreciated by persons skilled in the art. During the open state, all ions transmitted to the ion gate 108 are permitted to pass through the ion gate 108 to the next device of the TOF MS system 100 (the ion guide 112, or in some embodiments the mass filter 124). During the closed state, no ions transmitted to the ion gate 108 are permitted to pass through the ion gate 108, and instead are reflected from the ion gate 108, defected away from the ion beam axis, or otherwise blocked.

The ion gate 108 operates according to a duty cycle, which may be dictated by the controller 120. The duty cycle may be defined as the percentage of the gate cycle time during which the ion gate 108 is open and ions are thus allowed to pass through. If the value of the duty cycle is 100%, the ion gate 108 is always open during the gate cycle time, and thus the ion gate 108 does not limit the number of ions that enter the TOF analyzer 116 during the gate cycle time. If, for instance, the duty cycle is reduced to 50%, then the ion gate 108 is open during half of the gate cycle time and closed during half of the gate cycle time.

In some embodiments, the TOF MS system 100 may be operated in different modes, and may be switched from one mode to another, including as part of the same sample analysis. In one mode, the full mass range of ions produced in the ion source 104 are transmitted into the TOF analyzer 116 without fragmenting the ions. In another mode, only ions of one or more selected m/z ratios are transmitted into the TOF analyzer 116, such as by operating the mass filter 124 or other ion guide that provides low- and/or high-mass cutoffs. In another mode, the ions are fragmented (such as by operating the ion guide 112 as a collision cell or operating a separate collision cell) and the resulting fragment ions are transmitted into the TOF analyzer 116. In another mode, only ions of one or more selected m/z ratios (i.e., parent ions) are transmitted into the ion guide 112, the selected ions are fragmented in the ion guide 112 (or in a collision cell separate from the ion guide 112), and the fragment ions are transmitted into the TOF analyzer 116. A combination of one or more of the foregoing modes may be implemented as required by the desired method. For example, a spectrum of selected parent ions may be acquired, and subsequently (or simultaneously) a spectrum of fragment ions produced from the parent ions may be acquired. Such a process may be repeated for parent ions of different masses. When implementing different modes of operation or switching from one mode of operation to another mode of operation, different adjustments to the duty cycle may be implemented as needed to avoid saturating or overloading the detector system.

As an example of operation, the controller 120 monitors the ion signal (total detected beam current) measured by the detector 152 during a TOF scan, which may be implemented during the normal course of analyzing a sample. The controller 120 determines whether the ion signal intensity corresponding to the largest mass peak detected is too high, i.e., is saturating or will saturate the detector system. This determination may be done with consideration being given to one or more electronics components of the detector system known to be particularly susceptible to signal saturation. If the ion signal intensity is too high, the controller 120 adjusts the current duty cycle to a lower duty cycle (i.e., a smaller fraction of the current duty cycle). Subsequent ions reaching the ion gate 108 are subjected to the lower duty cycle, resulting in a lesser number of ions being transmitted in the TOF analyzer 116 and avoiding detector system saturation. Because the duty cycle being implemented at any given time is always known by the controller 120, the full amplitude of the original peak intensities may be obtained by taking the measured signal and dividing by the duty cycle (fraction). This process may be repeated for all sets of ions transmitted through the system. The controller 120 may also increase the duty cycle if it determines that the ion signal being detected is too low.

In some embodiments, calculating a new duty cycle (gate fraction) may be done as follows. If the largest peak height seen in a given spectrum is designated f and the duty cycle of the ion gate 108 is designated g, then the signal that would have been seen for that peak on the detector 152 without the gate (or with the gate open over the full cycle) is F, according to the relation:

$$f=g*F.$$

The "true" signal F is then:

F=f/g (the peak signal measured divided by the duty cycle that was in operation when peak signal was measured).

To avoid saturation, a target value TV (e.g., 0.7) may be selected from which a new duty cycle is then calculated, and which will result in a lesser number of ions entering the TOF analyzer 116 and thus a lower intensity of the peak signal f during the next iteration, as follows:

$$g=TV/F.$$

Because the value of F is not seen directly, it may be computed from the above formula F=f/g. Thus, for a given iteration of ions transmitted through the system, the new (adjusted) gate duty cycle for the next iteration may be calculated as follows:

$g_{(i+1)}=TV*g_i/f_i$ (i.e., the next duty cycle is TV times the previous duty cycle divided by the previous largest peak signal measured).

However, the value for g cannot be larger than 1, as 1 corresponds to a 100% (always open) duty cycle. Therefore, if the value selected for TV would result in $g_{(i+1)}$ being greater than 1, then $g_{(i+1)}$ is set to 1. Stated in another way, the value for $g_{(i+1)}$ is set to either 1 or $TV*g_i/f_i$, whichever is lower (i.e., the minimum value is selected). This condition may be expressed as:

$$g_{(i+1)}=\min(1,(TV*(g_i/f_i)).$$

For each iteration of ions run through the system, the above formula may be utilized to recalculate (adjust) the duty cycle g on the ion gate 108 so as to decrease the duty cycle when the detector system is saturated (or approaching saturation), and to increase the duty cycle when the detector system is not saturated and there is room for increasing signal intensity. Different target values (TV) may be selected for different operating conditions, such as the different modes of operation discussed above. For example, the target value utilized when scanning fragment ions may be different than the target value utilized when scanning more massive parent ions. The controller 120 may determine the target value to use according to the current conditions or mode of operation, and a look-up table of target values may be stored in a memory accessible by the controller 120, as appreciated by persons skilled in the art. It will also be understood that the above formula may be modified, or different formulas utilized, to provide alternative ways to determine adjustment of the duty cycle, or to provide additional or other functions such as, for example, filtering noise or anticipating when a peak signal is growing or diminishing from its previous value. In addition, peak signals other than the largest peak may be utilized to determine the adjustment of duty cycle. For example, for a given spectrum a user might choose to allow certain large peaks to saturate the detector system in a case where the user is not interested in those large peaks but rather is interested in smaller peaks. The system may be configured to allow the user to specify a list of peaks to exclude from the intensity adjustments.

It will be noted that the ion gate 108 functions in conjunction with the ion guide 112, and particularly in consideration of the axial length and pressure of the ion guide 112. When ions pass through the ion guide 112 they are spread out in time. The amount of time spreading that occurs is related to the number of collisions with gas molecules in the ion guide 112. At pressures typical for a collision cell, typical delay times through the ion guide 112 may range from tens of microseconds to several milliseconds, depending on the operating parameters (pressure, axial electric field, etc.). So although the ion gate 108 may pulse ions into the ion guide 112, the ions may nonetheless exit the ion guide 112 as a continuous beam as a result of the spreading and cooling that occurs in the ion guide 112. Thus, the gating operation will not adversely impact the pulsing operation of the TOF analyzer 116. Moreover, the time scale of the gating process is shorter than that of a typical chromatographic peak or band, and thus the gating operation will not affect a combined chromatographic-spectrometric analysis.

In a typical embodiment, the total gate cycle time should be shorter than the time spreading that occurs in the downstream ion guide 112. For example, if the time spreading in the ion guide 112 is 200 μs, the gate cycle time could be set to 100 μs. The time that the ion gate 108 is passing ions through to the ion guide 112 could then range from 100 μs (always open) when the detector system is not saturated down to 5 μs if the signal level is up to 20 times higher. This would then create a series of ion pulses entering the ion guide 112 that vary in length from 5 μs to almost 100 μs. If the ion guide 112 provides a time spread of 200 μs, then the ions exiting the ion guide 112 will appear to be a uniform, continuous stream of ions again such that, as noted above, there will be no impact on the repetition rate of the TOF analyzer 116. Larger time spreads in the ion guide 112, for example by utilizing higher pressures or longer physical lengths of the ion guide 112, may result in even higher gains in dynamic range.

In other embodiments, the methods described herein be implemented using the ion optics 128 as the ion gate.

Figure 2:
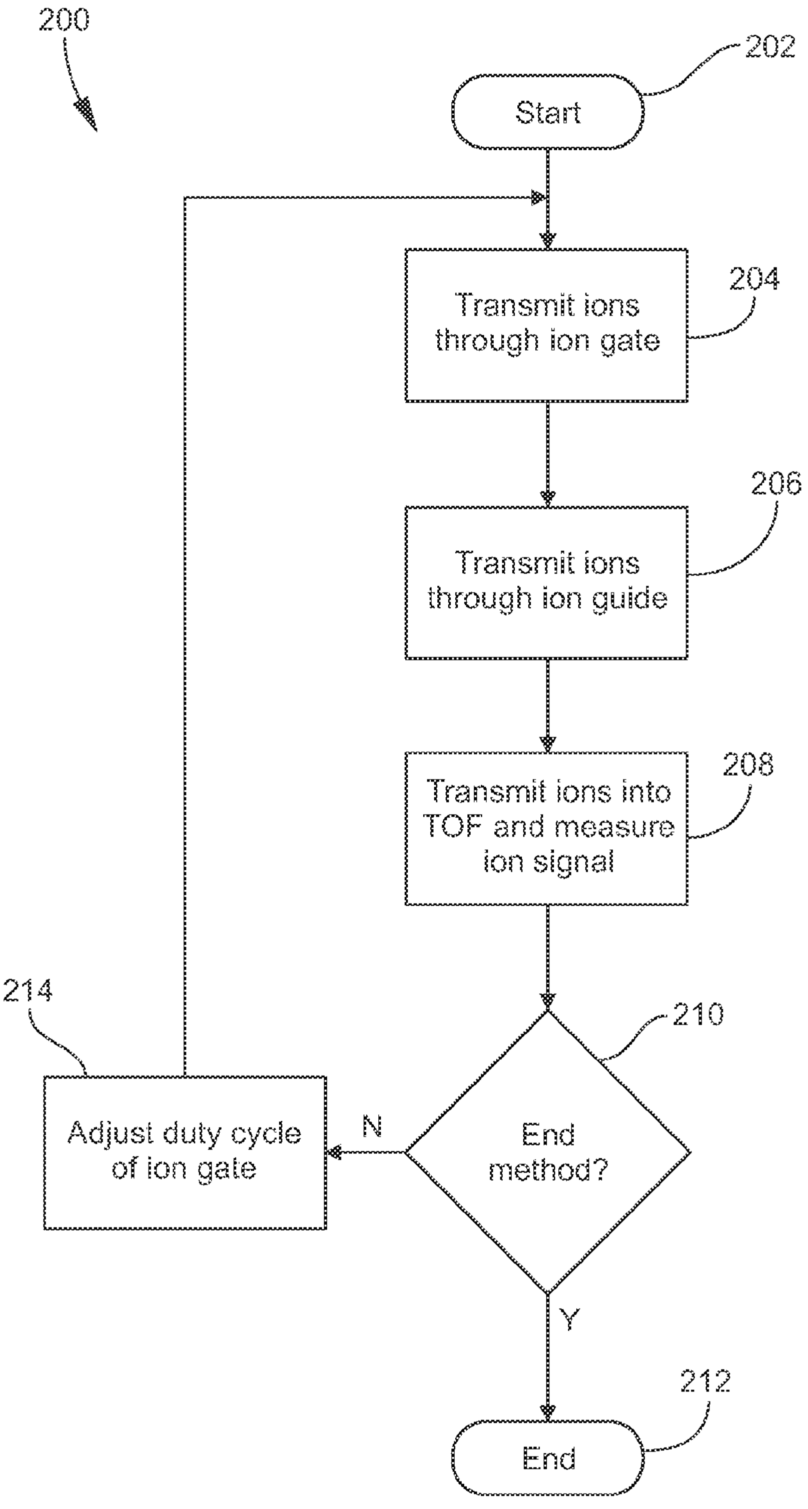
FIG. 2 is a flow diagram illustrating an example of a method for controlling ion transfer into a time-of-flight (TOF) analyzer according to some embodiments.

FIG. 2 is a flow diagram illustrating another example of a method or process 200 for controlling ion transfer into a time-of-flight (TOF) analyzer. After starting (202) the method (producing ions, etc.), ions are transmitted through an ion gate (204), through an ion guide (206) and into a TOF analyzer where the ion signal is measured (208). A determination (210) is made as to whether to end the method, which may depend whether sample analysis is to continue or has been completed at this point. If the method then either ends (212), or the proceeds to adjusting (recalculating) the duty cycle for the next iteration (214). The method may then be repeated for a desired number of additional iterations.

EXEMPLARY EMBODIMENTS

Exemplary embodiments provided in accordance with the presently disclosed subject matter include, but are not limited to, the following:

1. A method for controlling ion transfer into a time-of-flight (TOF) analyzer, the method comprising: transmitting ions through an ion gate and into an ion guide while operating the ion gate at a first duty cycle; transmitting the ions through the ion guide without trapping the ions; transmitting the ions into the TOF analyzer and measuring one or more ion signals corresponding to one or more mass peaks; comparing an intensity of the largest ion signal measured to a target value; and if the intensity of the largest ion signal is different from the target value, adjusting the duty cycle to a second duty cycle different from the first duty cycle.

2. The method of embodiment 1, comprising transmitting the ions through the ion guide while maintaining the ion guide at a gas pressure that cools the ions.

3. The method of embodiment 1 or 2, comprising transmitting the ions from the ion guide as a continuous beam.

4. The method of any of embodiments 1-3, comprising calculating the second duty cycle, $g_{(i+1)}$, according to: $g_{(i+1)}=\min(1, (TV^*(g_i/f_i))$, where TV is the target value, $g_i$ is the first duty cycle, and $f_i$ is the largest ion signal measured.

5. The method of any of embodiments 1-4, wherein the ions are a first set of ions and further comprising, after adjusting to the second duty cycle, transmitting a second set of ions through the ion gate and into the ion guide while operating the ion gate at the second duty cycle, transmitting the second set of ions into the TOF analyzer and measuring one or more ion signals corresponding to one or more mass peaks, comparing an intensity of the largest ion signal measured to a target value and, if the intensity of the largest ion signal is different from the target value, adjusting the duty cycle to a third duty cycle different from the second duty cycle.

6. The method of any of embodiments 1-5, comprising, after transmitting the ions through the ion gate, producing fragment ions, wherein the fragment ions are transmitted into the into the TOF analyzer.

7. The method of embodiment 6, wherein producing fragment ions occurs in the ion guide or in a collision cell separate from the ion guide.

8. The method of any of embodiments 1-7, comprising transmitting an initial set of ions through a mass filter upstream of the ion guide, selecting ions from the initial set, and allowing only the selected ions to exit the mass filter.

9. The method of embodiment 8, comprising producing fragment ions from the selected ions, wherein the fragment ions are transmitted into the into the TOF analyzer.

10. The method of any of embodiments 1-9, comprising selecting the target value according to a current mode of operation being implemented, wherein the current mode of operation is selected from the group consisting of: (i) transmitting the ions into the TOF analyzer without fragmenting the ions; (ii) fragmenting the ions and transmitting the fragmented ions into the TOF analyzer; (iii) transmitting only ions of one or more selected m/z ratios into the TOF analyzer; and (iv) transmitting only ions of one or more selected m/z ratios into the ion guide or a collision cell separate from the ion guide, fragmenting the selected ions in the ion guide or the separate collision cell, and transmitting the fragmented ions into the TOF analyzer.

11. The method of embodiment 10, comprising switching from the current mode of operation to a new mode of operation, and selecting a new target value according to the new mode of operation.

12. A time-of-flight mass spectrometry (TOF MS) system, comprising an ion gate, an ion guide, and a TOF analyzer, and configured for performing the method of any of embodiments 1-11.

13. A computer-readable storage medium, comprising instructions for performing the method of any of embodiments 1-11.

14. A time-of-flight mass spectrometry (TOF MS) system, comprising the computer-readable storage medium of embodiment 13.

15. A time-of-flight mass spectrometry (TOF MS) system, comprising: an ion gate; an ion guide downstream of the ion gate; a TOF analyzer downstream of the ion guide; and a controller communicating with the ion gate, the ion guide and the TOF analyzer, the controller configured for controlling the following steps: transmitting ions through an ion gate and into an ion guide while operating the ion gate at a first duty cycle; transmitting the ions through the ion guide without trapping the ions; transmitting the ions into the TOF analyzer and measuring one or more ion signals corresponding to one or more mass peaks; comparing an intensity of the largest ion signal measured to a target value; and if the intensity of the largest ion signal is different from the target value, adjusting the duty cycle to a second duty cycle different from the first duty cycle.

16. The TOF MS system of embodiment 15, wherein the ion guide is configured for producing fragment ions from the ions transmitted into the ion guide.

17. The TOF MS system of embodiment 15 or 16, comprising a mass filter upstream of the ion guide, and configured for selecting the ions from an initial set of ions received by the mass filter, and transmitting the selected ions from the mass filter to the ion gate.

18. The TOF MS system of embodiment 17, wherein the ion gate is upstream of the mass filter, or is between the mass filter and the ion guide.

19. The TOF MS system of any of embodiments 15-18, wherein the controller is configured for calculating the second duty cycle, $g_{(i+1)}$, according to: $g_{(i+1)}$=min (1, (TV*($g_i$/$f_i$)), where TV is the target value, $g_i$ is the first duty cycle, and f, is the largest ion signal measured.

20. The TOF MS system of embodiment 15, wherein the controller is configured for switching to different modes of operation, and selecting different target values for the different modes of operation.

While embodiments have been described herein primarily in the context of TOF-based systems, the present teachings may find utility for limiting signal intensity in conjunction with a single quadrupole system in which a quadrupole mass analyzer transmits a range of m/z ratios (without trapping) to a detector, or in the related triple quadrupole (QQQ) system (mass filter-collision cell-mass filler).

It will be noted that in any of the methods described herein, the gating operations, the monitoring of the ion signal, the comparisons and determinations made, and actions taken with regard to the foregoing, may be performed or controlled by the controller 120, as described elsewhere in the present disclosure.

It will also be noted that the system controller 120 is schematically depicted in FIG. 1 as representing one or more modules configured for controlling, monitoring, timing, synchronizing and/or coordinating various functional aspects of the TOF MS system 100 such as, for example, controlling the operation of the ion source 104; controlling the application of voltages to the ion guide 112 and controlling any additional functions provided such as gas flow for collisional cooling and/or CID; controlling the application of voltages to the mass filter and setting and adjusting the voltage parameters for selecting ions; controlling the ion pulser 148 and ion detector 152; controlling the ion gate 108 or 128 and any other ion optics (not shown) provided between the illustrated components; and controlling vacuum pumps (not shown) utilized at different stages of the TOF MS system 100. The system controller is also configured for controlling ion transfer into the TOF analyzer 116 in the manner described above. The system controller 120 may also be configured for receiving the ion detection signals from the ion detector 152 and performing other tasks relating to data acquisition and signal analysis as necessary to generate a mass spectrum characterizing the sample under analysis.

For all such purposes, the system controller 120 may include a computer-readable medium that includes instructions for performing any of the methods disclosed herein. The system controller 120 is schematically illustrated as being in signal communication with various components of the TOF MS system 100 via wired or wireless communication links represented by dashed lines. Also for these purposes, the system controller 120 may include one or more types of hardware, firmware and/or software, as well as one or more memories and databases. The system controller 120 typically includes a main electronic processor providing overall control, and may include one or more electronic processors configured for dedicated control operations or specific signal processing tasks. The system controller 120 may also schematically represent all voltage sources not specifically shown, as well as timing controllers, clocks, frequency/waveform generators and the like as needed for applying voltages to various components of the TOF MS system 100. The system controller 120 may also be representative of one or more types of user interface devices, such as user input devices (e.g., keypad, touch screen, mouse, and the like), user output devices (e.g., display screen, printer, visual indicators or alerts, audible indicators or alerts, and the like), a graphical user interface (GUI) controlled by software, and devices for loading media readable by the electronic processor (e.g., logic instructions embodied in software, data, and the like). The system controller 120 may include an operating system (e.g., Microsoft Windows® software) for controlling and managing various functions of the system controller 120.

It will be understood that the term "in signal communication" as used herein means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or sub-module.

More generally, terms such as "communicate" and "in . . . communication with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. A method for controlling ion transfer into a time-of-flight (TOF) analyzer, the method comprising:

transmitting ions through an ion gate and into an ion guide while operating the ion gate at a first duty cycle;

transmitting the ions through the ion guide without trapping the ions;

transmitting the ions into the TOF analyzer and measuring one or more ion signals corresponding to one or more mass peaks;

comparing an intensity of the largest ion signal measured to a target value; and if the intensity of the largest ion signal is different from the target value, adjusting the duty cycle to a second duty cycle different from the first duty cycle.

2. The method of claim 1, comprising transmitting the ions through the ion guide while maintaining the ion guide at a gas pressure that cools the ions.

3. The method of claim 1, comprising transmitting the ions from the ion guide as a continuous beam.

4. The method of claim 1, comprising calculating the second duty cycle, $g_{(i+1)}$, according to:

$$g_{(i+1)}=\min(1,(TV*(g_i/f_i)), \text{ where}$$

TV is the target value, $g_i$ is the first duty cycle, and $f_i$ is the largest ion signal measured.

5. The method of claim 1, wherein the ions are a first set of ions and further comprising, after adjusting to the second duty cycle, transmitting a second set of ions through the ion gate and into the ion guide while operating the ion gate at the second duty cycle, transmitting the second set of ions into the TOF analyzer and measuring one or more ion signals corresponding to one or more mass peaks, comparing an intensity of the largest ion signal measured to a target value and, if the intensity of the largest ion signal is different from the target value, adjusting the duty cycle to a third duty cycle different from the second duty cycle.

6. The method of claim 1, comprising, after transmitting the ions through the ion gate, producing fragment ions, wherein the fragment ions are transmitted into the into the TOF analyzer.

7. The method of claim 6, wherein producing fragment ions occurs in the ion guide or in a collision cell separate from the ion guide.

8. The method of claim 1, comprising transmitting an initial set of ions through a mass filter upstream of the ion guide, selecting ions from the initial set, and allowing only the selected ions to exit the mass filter.

9. The method of claim 8, comprising producing fragment ions from the selected ions, wherein the fragment ions are transmitted into the into the TOF analyzer.

10. The method of claim 1, comprising selecting the target value according to a current mode of operation being implemented, wherein the current mode of operation is selected from the group consisting of:

(i) transmitting the ions into the TOF analyzer without fragmenting the ions;

(ii) fragmenting the ions and transmitting the fragmented ions into the TOF analyzer;

(iii) transmitting only ions of one or more selected m/z ratios into the TOF analyzer; and (iv) transmitting only ions of one or more selected m/z ratios into the ion guide or a collision cell separate from the ion guide, fragmenting the selected ions in the ion guide or the separate collision cell, and transmitting the fragmented ions into the TOF analyzer.

11. The method of claim 10, comprising switching from the current mode of operation to a new mode of operation, and selecting a new target value according to the new mode of operation.

12. A time-of-flight mass spectrometry (TOF MS) system, comprising an ion gate, an ion guide, and a TOF analyzer, and configured for performing the method of claim 1.

13. A computer-readable storage medium, comprising instructions for performing the method of claim 1.

14. A time-of-flight mass spectrometry (TOF MS) system, comprising the computer-readable storage medium of claim 13.

15. A time-of-flight mass spectrometry (TOF MS) system, comprising:

an ion gate;

an ion guide downstream of the ion gate;

a TOF analyzer downstream of the ion guide; and a controller communicating with the ion gate, the ion guide and the TOF analyzer, the controller configured for controlling the following steps:

transmitting ions through an ion gate and into an ion guide while operating the ion gate at a first duty cycle;

transmitting the ions through the ion guide without trapping the ions;

transmitting the ions into the TOF analyzer and measuring one or more ion signals corresponding to one or more mass peaks;

comparing an intensity of the largest ion signal measured to a target value; and if the intensity of the largest ion signal is different from the target value, adjusting the duty cycle to a second duty cycle different from the first duty cycle.

16. The TOF MS system of claim 15, wherein the ion guide is configured for producing fragment ions from the ions transmitted into the ion guide.

17. The TOF MS system of claim 15, comprising a mass filter upstream of the ion guide, and configured for selecting the ions from an initial set of ions received by the mass filter, and transmitting the selected ions from the mass filter to the ion gate.

18. The TOF MS system of claim 17, wherein the ion gate is upstream of the mass filter, or is between the mass filter and the ion guide.

19. The TOF MS system of claim 15, wherein the controller is configured for calculating the second duty cycle, $g_{(i+1)}$, according to:

$$g_{(i+1)}=\min(1,(TV*(g_i/f_i)), \text{ where}$$

TV is the target value, $g_i$ is the first duty cycle, and $f_i$ is the largest ion signal measured.

20. The TOF MS system of claim 15, wherein the controller is configured for switching to different modes of operation, and selecting different target values for the different modes of operation.

* * * * *

UNITED STATES PATENT AND TRADEMARK OFFICE

CERTIFICATE OF CORRECTION

PATENT NO. : 8,624,181 B1
APPLICATION NO. : 13/840898
DATED : January 7, 2014
INVENTOR(S) : Kenneth Newton It is certified that error appears in the above-identified patent and that said Letters Patent is hereby corrected as shown below:

In the Claims

In column 11, line 36, in claim 6, delete “into the into the” and insert -- into the --, therefor.

In column 11, line 47, in claim 9, delete “into the into the” and insert -- into the --, therefor.

Signed and Sealed this
Thirteenth Day of May, 2014

Michelle K. Lee
*Deputy Director of the United States Patent and Trademark Office*